United States Patent [19]

Sasaki

[11] Patent Number: 4,916,656

[45] Date of Patent: Apr. 10, 1990

[54] TEXT PROCESSING SYSTEM HAVING SEARCH-AND-REPLACE FUNCTION FOR BOTH CHARACTER AND ATTRIBUTE DATA

[75] Inventor: Ryoichi Sasaki, Nagoya, Japan

[73] Assignee: Brother Kogyo Kabushiki Kaisha, Japan

[21] Appl. No.: 139,204

[22] Filed: Dec. 29, 1987

[30] Foreign Application Priority Data

Dec. 29, 1986 [JP] Japan .................. 61-315827

[51] Int. Cl.⁴ .................................. G06F 9/00
[52] U.S. Cl. .................. 364/900; 364/943.1; 364/943.4; 364/943.5
[58] Field of Search .................. 364/200, 900

[56] References Cited

U.S. PATENT DOCUMENTS 4,138,719  2/1979  Swanstrom et al. .................. 364/200

FOREIGN PATENT DOCUMENTS 0026304  4/1981  European Pat. Off. .
0052711  6/1982  European Pat. Off. .
2167220  5/1986  United Kingdom .

OTHER PUBLICATIONS

R. A. Herbert et al, IBM Technical Disclosure Bulletin, "Special Search Function", vol. 21, No. 11, Apr. 1979.

Primary Examiner—Gareth D. Shaw
Assistant Examiner—John G. Mills
Attorney, Agent, or Firm—Oliff & Berridge

[57] ABSTRACT

A test processing system having a search-and-replace function. The text data stored in a memory includes character data representative of characters and attribute data which designates the manner in which the characters are printed. The attribute data is stored in the memory in relation to the character data, in response to operations of appropriate attribute-data entry keys. A desired group of successive characters of the text data is searched in the memory, and replaced by a designated group of replacement characters. The system includes a data-replacing control device which is operable during a search-and-replace operation if the character data representative of a leading character of the searched group of characters is accompanied with attribute data. In this case, when the searched group of characters is replaced by the group of replacement characters, the attribute data for the leading character is stored in the memory, in relation to each set of character data representative of each of the replacement characters, such that all of the replacement characters are printed in a manner designated by the attribute data.

8 Claims, 5 Drawing Sheets

TEXT PROCESSING SYSTEM HAVING SEARCH-AND-REPLACE FUNCTION FOR BOTH CHARACTER AND ATTRIBUTE DATA

BACKGROUND OF THE INVENTION

1. Field of the Invention

The present invention relates in general to a data or text processing system having a search-and-replace function and capable of handling attribute data which designates the manner in which entered text is printed. More particularly, the invention is concerned with a data replacing operation wherein when a certain group of successive characters in a memory is searched and replaced by a designated group of replacement characters, attribute data stored for the leading (first) character of the searched group is stored in the memory so that all the replacement characters newly stored in the memory are printed in a manner designated by the attribute data.

2. Discussion of the Prior Art

A word processor and an electronic typewriter are commonly known as a text processing system. Usually, these text processing systems have a search-and-replace function of replacing a given group of character data by another group of character data, and a function of handling attribute data which designates the manner in which the character data is printed.

For example, underscoring data is known as a typical kind of attribute data. Described more specifically, when an underscoring mode is established by a suitable key during entry of text data, a desired group of successive characters may be underscored when the characters are printed. When the search-and-replace function is executed to replace a certain word in a text memory by a desired replacement word, the word to be replaced is entered through a keyboard, and the text memory is scanned to search for the entered word. The search word is replaced by the desired replacement word which is also entered through the keyboard. In this search-and-replace operation, the following problem is conventionally encountered in connection with the attribute data.

In the text memory of a text processing system such as the word processor and electronic typewriter described above, character data representative of a character which is normally printed is stored without attribute data appended thereto. On the other hand, character data representative of a character which is printed in a special manner is stored in combination with the appropriate attribute data appended thereto. The conventional processing system is classified into two types, in terms of handling attribute data when a search-and-replace function is executed where character data in the text memory which is to be replaced is accompanied with the attribute data.

In the first type of search-and-replace arrangement, the attribute data of the group of characters to be replaced is ignored. Namely, the attribute data is erased when the searched group of characters is replaced by a group of replacement characters. In this case, the erased attribute data must be re-entered through the appropriate key, and the data editing efficiency of the text processing system is lowered.

In the second type of search-and-replace arrangement, the data replacing operation includes a step of determining whether each set of character data of the searched group of characters to be replaced is accompanied with attribute data or not. According to this determination, the attribute data is appended to the character data of each replacement character, which replaces the searched character data accompanied with the attribute data. This arrangement requires a considerably complicated control program for performing the search-and-replace operation, and suffers from a low data processing speed in the search-and-replace operation. Further, the same arrangement suffers from a problem that the attribute data will not be appended to the character data of a last replacement character or characters which do not correspond to the characters of the searched group to be replaced, because the number of the replacement characters exceeds that of the characters to be replaced.

SUMMARY OF THE INVENTION

It is therefore an object of the present invention to provide a text processing system which has a search-and-replace function, wherein when a certain group of successive characters in a memory is searched and replaced by a designated group of replacement characters, attribute data stored for the leading (first) character of the searched group to be replaced is stored in the memory so that all the replacement characters newly stored in the memory are printed in a manner designated by the attribute data.

The above object may be attained according to the principle of the present invention, which provides a text processing system comprising: (a) input means for entering text data representative of a text, the input means including character keys for entering character data representative of respective characters and at least one attribute-data entry key for entering attribute data which affects a manner in which the entered characters are printed, the text data including the character data and the attibute data; (b) memory means for storing the text data; (c) printing means for printing the characters entered through the character keys, according to the character data and the attribute data; (d) attribute-data storing control means for storing in the memory means the attribute data in relation to the character data, in response to operations of the at least one attribute-data entry key; (e) search-and-replace control means for controlling a search-and-replace operation, the search-and-replace control means being operable to scan the memory means to search for a first group of successive characters represented by the character data stored in the memory means, which first group is identical with a second group of successive characters entered through the input means, the search-and-replace control means being operable to replace the searched first group of successive characters by a third group of successive characters consisting of replacement characters; and (f) attribute data-replacing control means operable during the search-and-replace operation if the character data representative of a leading character of the first group of successive characters is accompanied with specific attribute data entered through one of the at least one attribute-data entry key. The attribute data-replacing control means is adapted to provide the specific attribute data to the memory means, in relation to each set of character data representative of each of the replacement characters of the third group, so that all of the replacement characters are printed in a manner designated by the specific attribute data.

In the text processing system of the present invention constructed as described above, attribute data such as underscoring and boldface printing data entered through the appropriate attribute-data entry keys are stored in the memory means, in relation to the character data, under the control of the attribute-data storing control means. The search-and-replace operation is controlled by the search-and-replace control means such that the memory means is first scanned to find a first group of successive characters which is identical with a second group of characters which are entered by the operator for replacement thereof by third group of characters which consists of replacement characters which are also entered by the operator. The characters of the searched group in the memory means are replaced by the replacement characters. When the character data representative of a leading character of the searched successive characters to be replaced is accompanied with certain attribute data entered through the appropriate attribute-data entry key, the attribute data-replacing control means is activated to store that attribute data in the memory means, in relation to each set of character data representative of each replacement character, so that all the replacement characters are printed in a manner designated by the attribute data.

It follows from the above description that the search-and-replace operation on the present text processing system is implemented such that the attribute data for the leading character of the searched group of characters to be replaced is stored in the memory means, for each set of character data representative of each replacement character newly stored in the memory means in place of the searched group of characters. This replacing operation can be accomplished by executing a relatively simple control program, which requires a comparatively short data processing time. Furthermore, the instant arrangement permits automatic insertion of attribute data even for the replacement characters which do not correspond to the characters of the searched group to be replaced. In other words, the attribute data can be appended to each set of character data of each replacement character, even where the number of the replacement characters exceeds that of the characters to be replaced. Accordingly, the instant system eliminates an otherwise required subsequent operation by the operator to add the attribute data for the terminal portion of the replacement character group where the number of characters of the replacement character group is larger than that of the searched and replaced character group. Therefore, the instant text processor provides improved text editing efficiency.

According to one feature of the invention, the attribute data includes at least one attribute data selected from the group which consists of: underscoring data for underscoring the characters; boldface print data for printing the characters in a boldfaced fashion; overstriking data for overstriking the characters; superscript data for printing the characters at an elevated position with respect to a normal printing level; and subscript data for printing the characters at a lowered position with respect to the normal printing position.

According to another feature of the invention, the search-and-replace control means automatically replaces the first group of successive characters with the replacement characters of the third group of successive characters, if the search-and-replace control means determines that the first group of successive characters in the memory means is identical with the second group of successive characters.

In accordance with a further feature of the invention, the search-and-replace control means comprises: (i) means for automatically deleting the first group of successive characters from the memory means upon determination that the first group is identical with the second group of successive characters; (ii) replace-character counter means for storing data representative of the number of the replacement characters of the third group; (iii) means for inserting the replacement characters sequentially in an order from the leading character, at a position of the memory means from which the first group of successive characters has been deleted, the means for inserting the replacement characters including a memory pointer for designating addresses of the memory means at which the replacement characters are inserted, respectively; means for incrementing the memory pointer when each of the replacement characters is inserted; means for decrementing the replacement-character counter when the memory pointer is incremented; (iv) and means for determining whether the replacement-character counter has been zeroed or not, and activating the inserting means to insert a next one of the replacement characters upon determination that the replacement-character counter has not been zeroed, and terminating an insertion of the replacement characters upon determination that the replacement-character counter has been zeroed.

In one form of the above feature of the invention, the attribute data-replacing control means comprises: an attribute-data memory for storing the specific attribute data appended to the character data representative of the leading character of the first group of successive characters; means for providing the specific attribute data to the attribute-data memory when the search-and-replace control means determines that the first group of successive characters is identical to the second group of successive characters; and means for providing the specific attribute data to an address of the memory means at which each of the replacement characters inserted by the inserting means.

According to a still further feature of the invention, the attribute data-replacing control means comprises an attribute-data memory for storing the specific attribute data appended to the character data representative of the leading character of the first group of successive characters, when the search-and-replace control means determines that the first group of successive characters is identical with the second group of successive characters. The attribute data-replacing control means further comprises means operable according to the specific attribute data stored in the attribute-data memory, for providing the specific attribute data to the memory means, such that the specific attribute data is effective to each of the replacement characters of the third group of successive characters.

According to a yet further feature of the invention, the memory means stores each set of character data representative of each character as one byte of data, and stores each set of the specific attribute data as another byte of data. These two bytes of data are stored at one address of the memory means.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

The electronic typewriter as a data processing system having a search-and-replace function according to one embodiment of the present invention is shown in FIGS. 1, 2, 3A and 3B. As described below in detail, this typewriter is capable of searching for a group of successive characters and replacing the characters by another group of characters.

Figure 1:
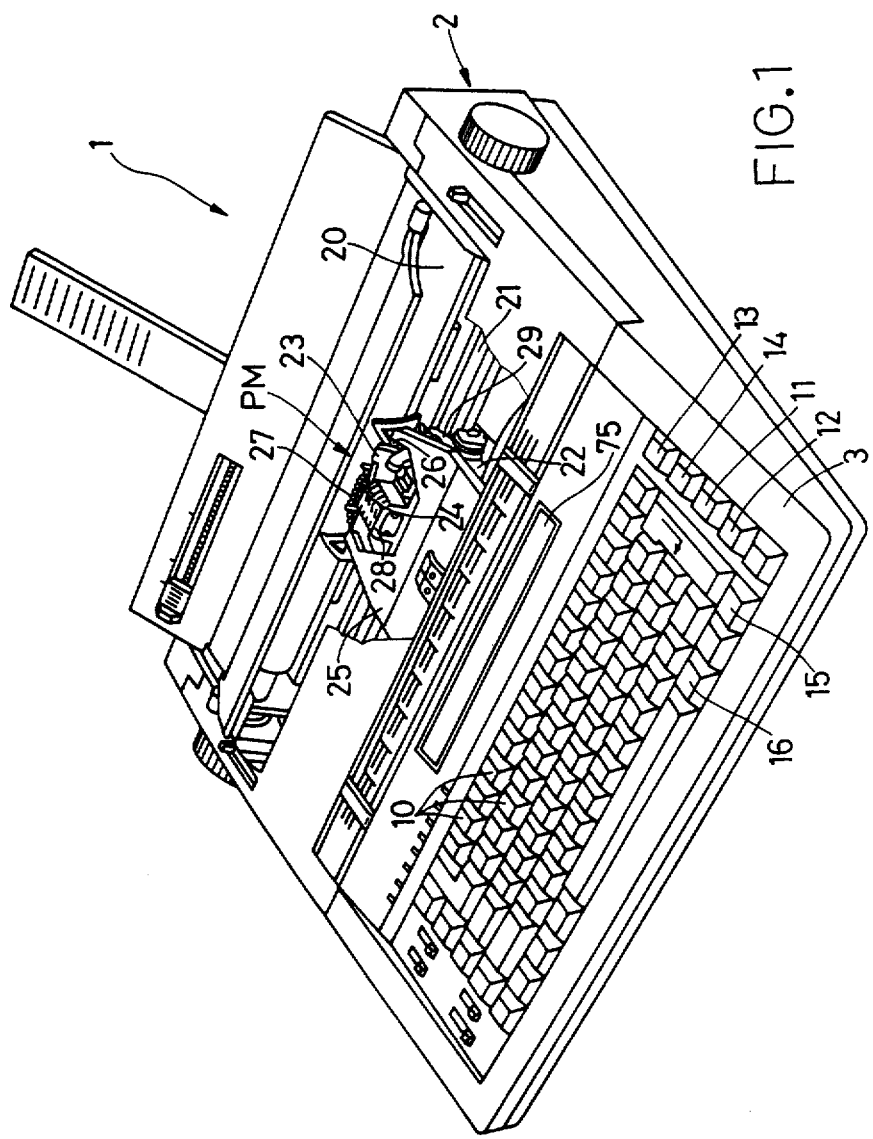
FIG. 1 is a perspective view of the preferred embodiment of the invention in the form of an electronic typewriter.

Referring first to FIG. 1, the typewriter is generally indicated at 1. The typewriter has a main frame 2 whose front portion accommodates a keyboard 3, and whose rear portion accommodates a printing mechanism PM. Between the keyboard 3 and the printing mechanism PM, there is disposed a liquid crystal display 75 (hereinafter referred to as LCD 75) which is adapted to display a line of characters such as letters and symbols.

The keyboard 3 has character keys 10 such as alphabet keys, numeral keys and symbol keys, and various function keys which include those function keys commonly provided on an ordinary electronic typewriter known in the art. The function keys further include: attribute-data entry keys such as an AUTO UNDERSCORE key 11 for underlining printed characters, and a BOLDFACE key 12 for printing characters in a boldfaced fashion; a SEARCH key 13 for scanning text data in a TEXT memory 52 (which will be described) to search for a designated group of successive characters (which usually constitute a word); a REPLACE key 14 for replacing all occurrences of the searched group of successive characters by a designated group of replacement characters; an EXECUTE key 15 used to perform various editing functions; and an ERASE key 16 for erasing a printed character.

The attribute-data entry keys such as the AUTO UNDERSCORE AND BOLDFACE keys 11, 12 are used for entering attribute data which influences or designates the manner in which characters are printed.

The printing mechanism PM includes: a platen 20 for supporting and feeding a sheet of paper, a drive motor for rotating the platen 20, and a driver circuit for controlling this platen drive motor; a carriage 22 supported by a guide 21 parallel to the platen 20, a drive motor for reciprocating the carriage 20, and a driver circuit for the carriage drive motor; a typewheel 24 accommodated in a typewheel cassette 23, a drive motor for indexing the typewheel 24, and a driver circuit for this indexing motor; a print ribbon 26 accommodated in a ribbon cassette 25, a drive motor for feeding the ribbon 26, and a driver circuit for the ribbon feed motor; a print hammer for striking type fonts 27 of the typewheel 24, a hammer solenoid 28 for activating the print hammer, and a driver circuit for the hammer solenoid 28; and a ribbon-lift mechanism for selectively bringing the print ribbon 26 and a correction ribbon 29 into an operative position. The printing mechanism PM is similar in construction to a printing mechanism of an ordinary electronic typewriter known in the art.

A control system of the instant electronic typewriter 1 will be described referring to the block diagram of FIG. 2.

Figure 2:
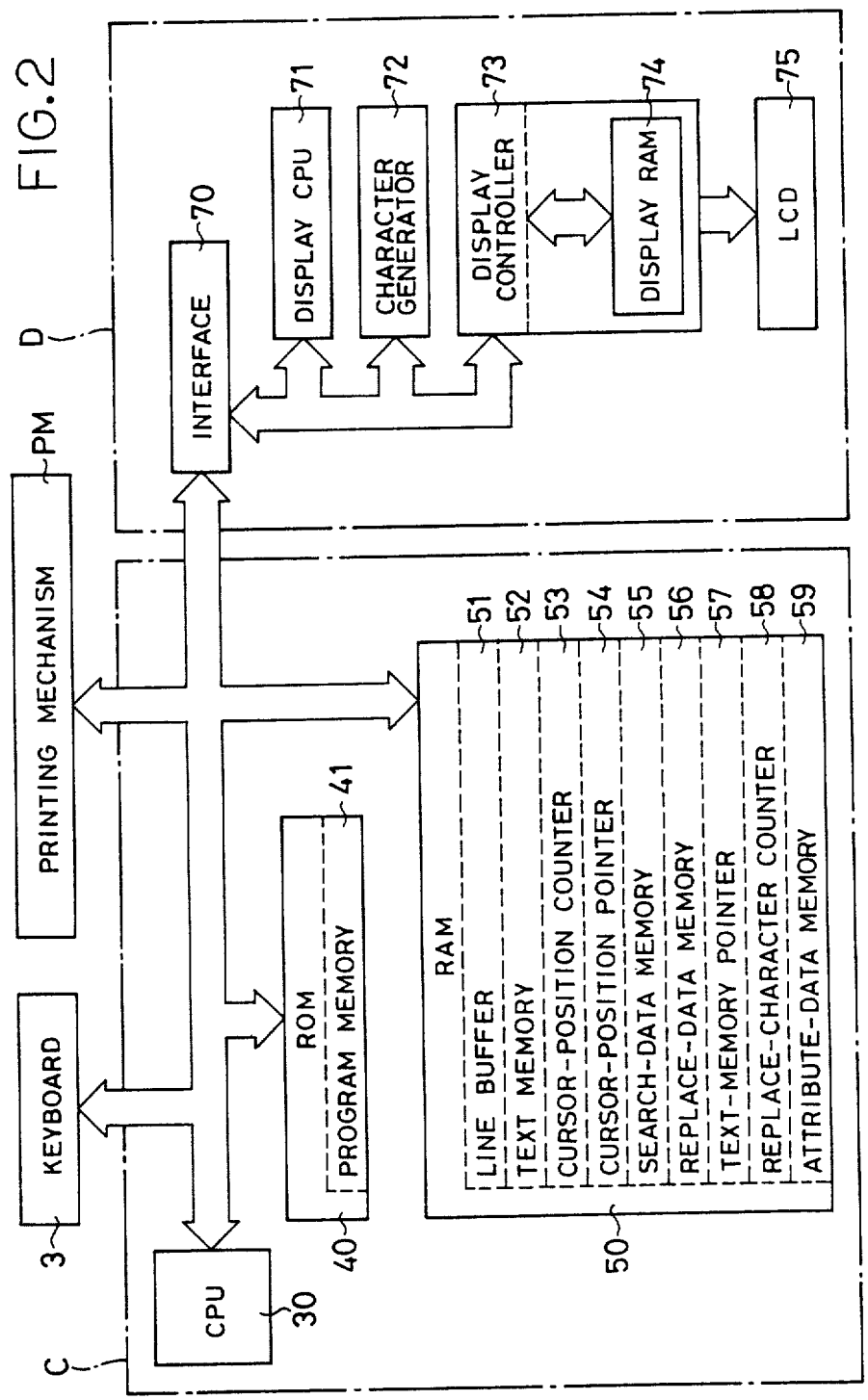
FIG. 2 is a schematic block diagram showing a control system of the typewriter of FIG. 1.

As shown in FIG. 2, the typewriter 1 is principally constituted by the keyboard 3 and printing mechanism PM which have been described, and a display device D and a control device C which will be described. The keyboard 3, printing mechanism PM and display device D are connected by a data bus to a main CPU (central processing unit) 30 of the control device C.

The control device C includes the main CPU 30 indicated just above, and a ROM (read-only memory) 40 and a RAM (random-access memory) 50 which are connected by the data bus to the main CPU 30.

The ROM 40 includes a program memory 41 which stores various control programs which include: a program for controlling the printing mechanism PM and the display device D, according to code data entered through the character keys 10 and the various function keys on the keyboard 3; a program for performing the search-and-replace function; a program for controlling an operation of storing attribute data in connection with character data; and a program for controlling an operation of replacing the character data and the attribute data.

The RAM 50 includes a line buffer 51, a TEXT memory 52, a CURSOR-POSITION counter 53, a CURSOR-POSITION pointer 54, a SEARCH-DATA memory 55, a REPLACE-DATA memory 56, a TEXT-MEMORY pointer 57, a REPLACE-CHARACTER counter 58 and an ATTRIBUTE-DATA memory 59. The line buffer 51 sequentially stores character data corresponding to a maximum of last 500 characters which have been printed in a typewriter mode. In a memory mode, the line buffer 51 stores entered character data corresponding to one line of characters displayed on the LCD 75. The TEXT memory 52 stores document or text data representative of a text or texts which have been entered through the keyboard 3 in a memory mode. The CURSOR-POSITION counter 53 is adapted to detect the current position of a cursor on the LCD 75, by counting the number of digit positions on the LCD 75 as the cursor is moved. The CURSOR-POSITION pointer 54 designates the address of the line buffer 51, which corresponds to the current position of the cursor represented by the current count of the counter 53. The SEARCH-DATA memory 55 stores a group of character data which has been entered following an operation of the SEARCH key 13, so that the entered character data is searched through the TEXT memory 52. The REPLACE-DATA memory 56 stores a group of character data which has been entered following an operation of the REPLACE key 14, so that the entered character data is substituted for another group of character data which is searched through the TEXT memory 52. The TEXT-MEMORY pointer 57 is adapted to sequentially designate the addresses of the TEXT memory 52. The REPLACE-CHARACTER counter 58 is adapted to count the number of characters which have been entered into the REPLACE-DATA memory 56. The ATTRIBUTE-DATA memory 59 stores attribute data appended to the coded character data which is stored at the address of the TEXT memory 52 which is designated by the TEXT-MEMORY pointer 57. The RAM 50 further includes a current-position memory which stores data indicative of the current position of the carriage 22 (print head), such that the stored data is updated as the carriage 22 is moved. The RAM 50 also includes various registers for temporarily storing arithmetic results obtained by the main CPU 30.

The TEXT memory 52 uses one byte for storing character data representative of each character entered through the appropriate character key 10. If the character data is accompanied with attribute data which represents one of attributes such as underscoring and boldface printing that are designated by the AUTO UNDERSCORE and BOLDFACE keys 11, 12, the TEXT memory 52 uses another byte for storing the attribute data appended to the character data. In this latter case, therefore, two bytes are used for storing the character data and the attribute data in combination.

While the typewriter 1 is placed in the typewriter mode, the main CPU 30 is operated according to the appropriate control program so that characters (letters, numerals and symbols) entered through the character keys 10 are printed by the printing mechanism PM, and the character data corresponding to the last printed 500 characters is stored in the line buffer 51.

In the memory mode of operation, the entered character data corresponding to one line of characters is stored in the line buffer 51 and is displayed on the LCD 75. The character data stored in the buffer memory 51 is transferred to the TEXT memory 52 when a carriage-return key is operated.

The display device D includes an interface 70, a display CPU 71, a character generator 72, a display controller 73, and the LCD (liquid crystal display) 75 indicated above. Electrical connections of these elements of the display device D are shown in FIG. 2. The character generator 72 stores a batch of dot-matrix display pattern data corresponding to coded character data representative of about 400 characters, which are displayed on the LCD 75.

The display CPU 71 receives via the interface 70 various commands and character data from the main CPU 30 of the control device C, and commands the character generator 72 to generate the display pattern data corresponding to the received commands and character data. The generated display pattern data is applied to the display controller 73, which in turn stores the received display pattern data in a display RAM 74 incorporated therein. At the same time, the display controller 73 applies the corresponding drive signals to the LCD 75, so that the characters represented by the appropriate display pattern data are displayed on the LCD 75. The display CPU 71 also receives via the interface 70 cursor control data from the main CPU 30, and commands the display controller 73 so that the cursor on the LCD 75 is moved to the digit position represented by the cursor control data.

When the ERASE key 16 is operated, a printed character is erased with the correction ribbon 29, by striking the appropriate type font 27 corresponding to the printed character, according to the character data stored in the line buffer 51.

The search-and-replace function is executed in a manner well known in the art. Briefly, a group of successive characters to be replaced is entered after the SEARCH key 13 is activated. Then, a desired group of replacement characters is entered following an operation of the REPLACE key 14. When the EXECUTE key 15 is operated in this condition, the TEXT memory 52 is scanned to search for the entered group of successive characters to be replaced, in a portion of the text data involved following the current address which corresponds to the current position of the cursor on the LCD 75. Every occurrence of the searched group of characters is erased from the TEXT memory 52, and is replaced by the designated group of replacement characters.

Figure 3A:
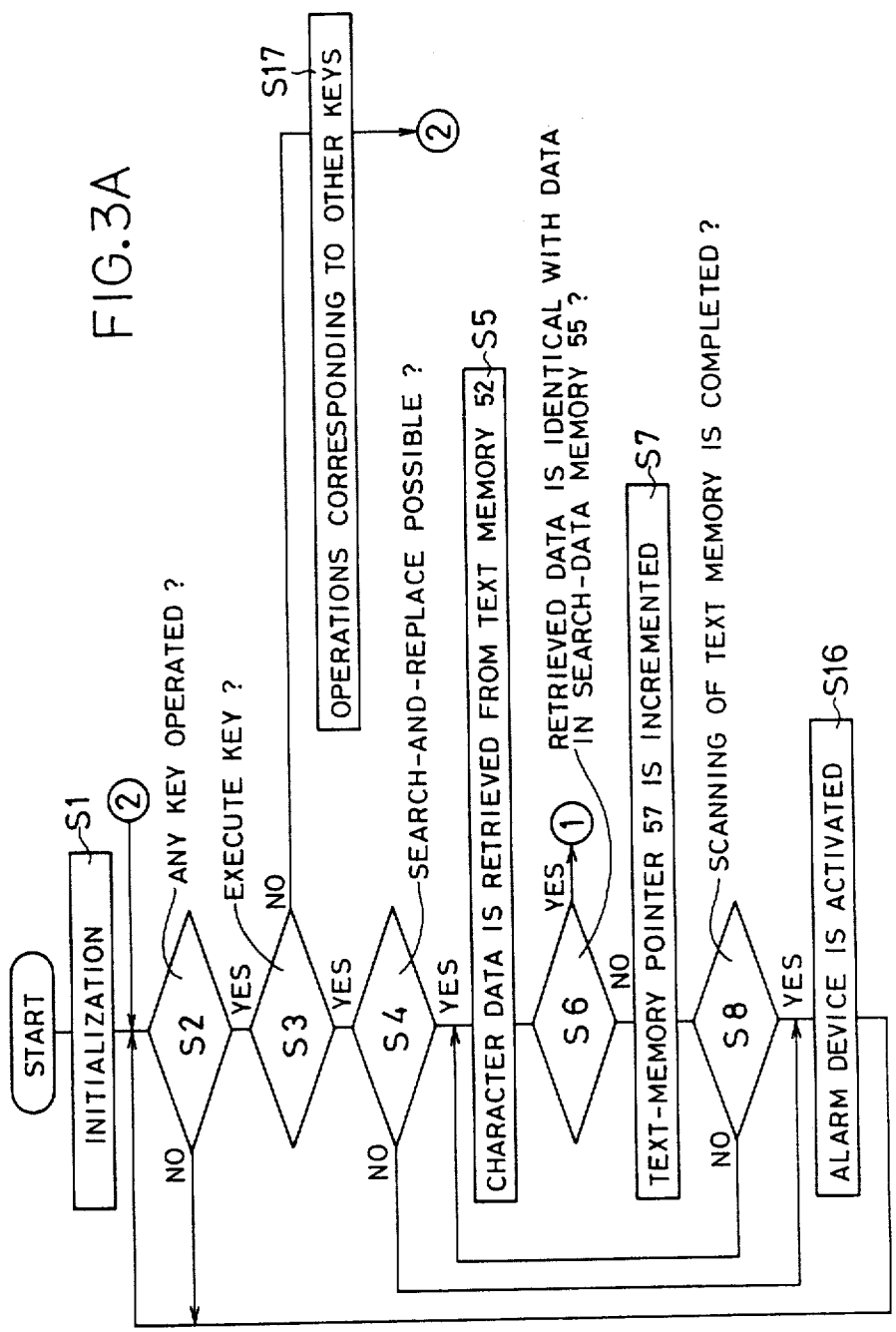
FIGS. 3A and 3B are flow charts illustrating a control routine for replacing character data and attribute data.
Figure 3B:
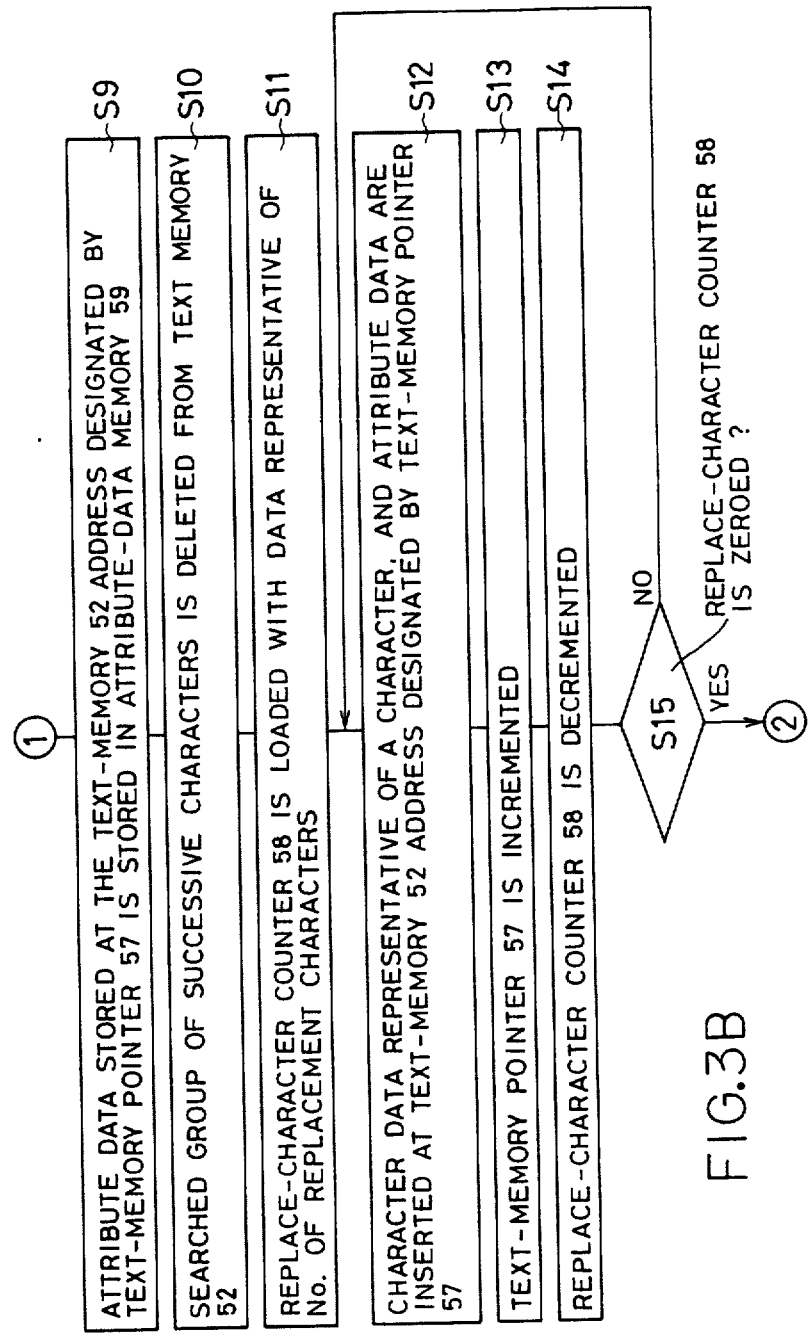

Referring next to the flow chart of FIGS. 3A and 3B, there will be described a control routine which is implemented by the control device C, for replacing attribute data during a search-and-replace operation on the present electronic typewriter 1.

When power is applied to the typewriter 1, the control flow goes to step S1 (FIG. 3A) to initialize settings of the various components of the typewriter, e.g., to clear the REPLACE-CHARACTER counter 58 and the various memories. In the next step S2, the control determines whether any key on the keyboard 3 has been operated. If an affirmative decision (YES) is obtained in step S2, the control flow goes to step S3 to determine whether the operated key is an EXECUTE key 15 or not. If the other key such as the SEARCH key 13 or REPLACE key 14 is operated, a negative decision (NO) is obtained in step S3, and the flow goes to step S17 in which an operation corresponding to the operated key other than the EXECUTE key 15 is implemented. For instance, a group of character data entered following an operation of the SEARCH or REPLACE key 13, 14 is stored in the appropriate SEARCH-DATA or REPLACE-DATA memory 55, 56, if the SEARCH or REPLACE key 13, 14 is operated. Then, the flow returns to the step S2.

If the EXECUTE key 15 is operated, the control flow goes to step S4 in which the TEXT-MEMORY pointer 57 is loaded with data designated by the CURSOR-POSITION pointer 53, and a determination is made as to whether any data has been stored in the SEARCH-DATA memory 55 and in the REPLACE-DATA memory 56. Namely, step S4 is executed to determine whether a search-and-replace operation is possible or not. If an affirmative decision (YES) is obtained, step S4 is followed by step S5 in which the main CPU 30 operates according to the data in the SEARCH-DATA memory 55, TEXT memory 52 and TEXT-MEMORY pointer 57, to retrieve from the TEXT memory 52 a first group of successive characters the first character of which corresponds to the current address of the TEXT memory 52 and which correspond to the (second) group of characters stored in the SEARCH-DATA memory 55. If a negative decision is obtained in step S4, the control flow goes to step S16 to activate a suitable alarm device such as a buzzer, informing the operator that it is not possible to perform a search-and-replace operation.

Step S5 is followed by step S6 to determine whether the first group of characters retrieved from the TEXT memory 52 is identical with the second group of characters represented by the data stored in the SEARCH-DATA memory 55. If a negative decision (NO) is obtained in step S6, that is, the retrieved character data is not identical with the character data in the SEARCH-DATA memory 55, the control flow goes to step S7 in which the TEXT-MEMORY pointer 57 is incremented. Then, step S8 is implemented to determine whether the control has completed the scanning of the portion of the text data stored after the address which is designated by the TEXT-MEMORY pointer 57 at the time of operation of the EXECUTE key 15 (step S3). If a negative decision (NO) is obtained in step S8, that is, if character data to be scanned is still left in the TEXT memory 52, the flow goes back to step S5, and repeat step S6–S8 in order to retrieve from the TEXT memory 52 the next group of successive characters the first character of which is stored at the address currently designated by the TEXT-MEMORY pointer 57 which has been incremented in step S7 in the preceding searching cycle. Thus, the searching cycle is repeated until the character data stored in the SEARCH-DATA memory 55 is found in the TEXT memory 52 in step S6. If an affirmative decision (YES) is obtained in step S6, the control flow goes to step S9 (FIG. 3B) in which the main CPU 30 stores in the ATTRIBUTE-DATA memory 59 any attribute data which is appended to the character data stored at the address of the TEXT memory 52 currently designated by the TEXT-MEMORY pointer 57. Namely, the ATTRIBUTE-DATA memory 59 stores any attribute data appended to the character data which represents the first character of the group of successive characters which has been found in the TEXT memory 52. Subsequently, the control flow goes to step S10 in which the character data representative of the searched (first) group of successive characters is erased from the TEXT memory 52. Step S10 is followed by step S11 in which the REPLACE-CHARACTER counter 58 is loaded with data representative of the number of replacement characters (third group of characters) stored in the REPLACE-DATA memory 56. In the next step S12, character data representative of one of the replacement characters stored in the REPLACE-DATA memory 56 is inserted as one byte of data at the address of the TEXT memory 52 which is designated by the TEXT-MEMORY pointer 57. At the same address of the TEXT memory 52, there is inserted as another byte of data the attribute data which is stored in the ATTRIBUTE-DATA memory 59. Step S12 is followed by step S13 in which the TEXT-MEMORY pointer 57 is incremented to designate the next address of the TEXT memory 52. Then, the flow goes to step S14 in which the REPLACE-CHARACTER counter 58 is decremented in order to insert the next replacement character data in the TEXT memory 52.

Then, the control flow goes to step S15 to determine whether the count of the REPLACE-CHARACTER counter 58 has been zeroed or not. If a negative decision (NO) is obtained in step S15, the main CPU 30 repeats steps S12–S14 and thereby inserts the next replacement character data along with the stored attribute data in memory 59 at the next address of the TEXT memory 52. Steps S12 through S15 are repeated until each replacement character data has inserted together with the stored attribute data, that is, until an affirmative decision (YES) is obtained in step S15. Then, the control flow goes back to the step S2.

Since the second group of characters to be searched and the (third) group of characters to be substituted for the searched group of characters have been stored in the SEARCH-DATA and REPLACE-DATA memories 55, 56, respectively, an affirmative decision (YES) is obtained again in step S2, and the control goes to step S3. Upon the second operation of the EXECUTE key 15, steps S5–8 are again repeated until the next occurrence of the (second) group of characters stored in the SEARCH-DATA memory 55 is found in the TEXT memory 52 (step S6), or until the scanning of the TEXT memory 52 is completed (step S8). If the second occurrence of the character data in the SEARCH-DATA memory 55 is found in the TEXT memory 52, steps S9–S11 are executed, and steps S12–S15 are repeatedly executed to replace the searched second occurrence of the character data in the TEXT memory 52, by the character data stored in the REPLACE-DATA MEMORY 56. Thus, by operating the EXECUTE key 15 a suitable number of times, all occurrences of the designated group of successive characters which are found in the TEXT memory 52 can be replaced by a desired group of successive characters. Upon completion of the scanning of the TEXT memory 52, the flow goes to step S16 to inform the operator of the completion of the instant search-and-replace operation.

Figure 4A:
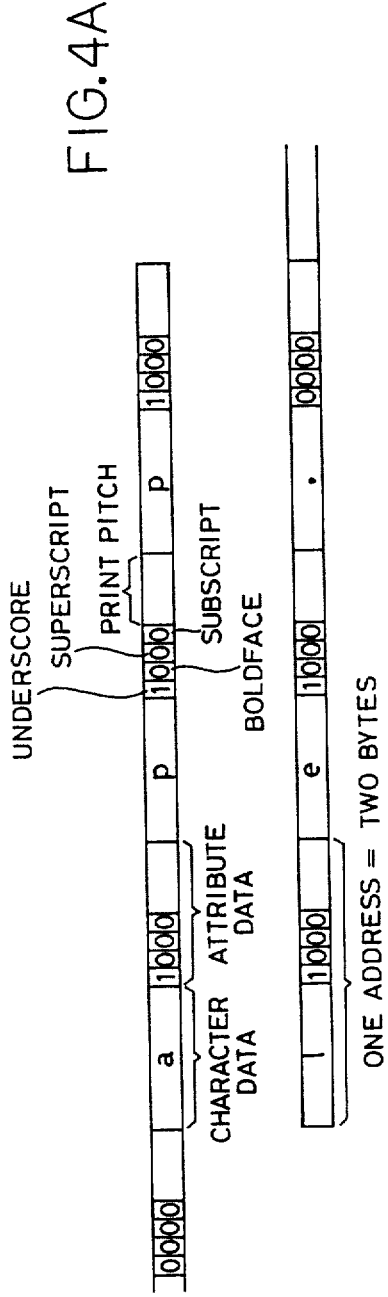
FIGS. 4A and 4B are schematic illustrations of the manner in which text data is stored and replaced, in accordance with the present invention.

FIG. 4A schematically illustrates a portion of text data stored in the TEXT memory 52, which portion stores word data representative of a word "apple", and attribute data indicative of the underscoring of the word. Each character of the word "apple" is represented by one byte of character data (ASCII code) which is followed by one byte of attribute data. These two bytes are stored at one address of the TEXT memory 52. Four bits of the attribute data byte are assigned to the underscoring, boldface, superscript and subscript, as indicated in FIG. 4A. In the specific example shown, only the underscoring bit is "1". The other bits of the attribute data byte are assigned to specify the printing pitch.

Figure 4B:
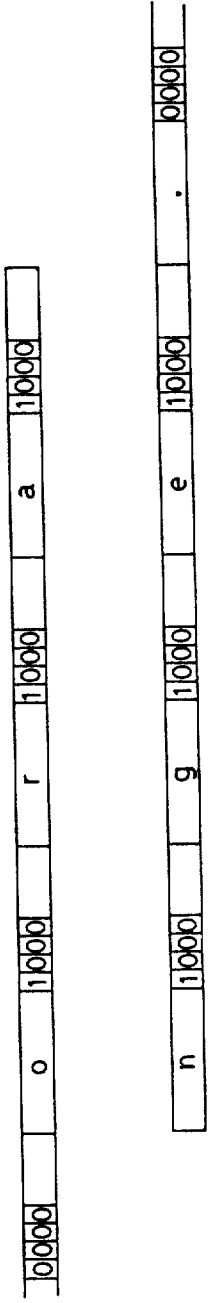

Suppose the word "apple" thus stored in the TEXT memory 52 is replaced by a word "orange", the word "apple" is entered into the SEARCH-DATA memory 55 through the keyboard 3 after the SEARCH key 13 is operated. Further, the word "orange" is entered into the REPLACE-DATA memory 56 after the REPLACE key 14 is operated. See the above description with respect to steps S2, S3, S17 and S4. When the EXECUTE key 15 is operated in step S3 in this condition, the word "apple" in the TEXT memory 52 is searched for based on the word "apple" stored in the SEARCH-DATA memory 55 (steps S5–S8). When the word "apple" in the TEXT memory 52 is found, the four bits of attribute data "1", "0", "0" and "0" following the character data representative of the first character "a" of the word "apple" are stored in the ATTRIBUTE-DATA memory 59 (step S9), and the character data and attribute data for the word "apple" are deleted from the TEXT memory 52 (step S10). Then, the character data representative of the first character "o" of the word "orange" stored in the REPLACE-DATA memory "56" is stored as one byte at the address of the TEXT memory 52 at which the character data "a" was stored, and the attribute data stored in the ATTRIBUTE-DATA memory 59 is stored as another byte at the same address, following the character data "o", as illustrated in FIG. 4B. See steps S12. Then, the TEXT-MEMORY pointer 57 is incremented (step S13), and the second character data "r" and the attribute data are stored in the next address of the TEXT memory 52 (step S12), as also illustrated in FIG. 4B. It will be understood that the character data representative of the last character "e" of the word "orange" is stored at the address of the TEXT memory 52 at which the character data representative of the character "." following the word data "apple" was stored. Therefore, the content of the TEXT memory 52 after the word data "orange" is shifted by one address. Thus, the attribute data stored in the ATTRIBUTE-DATA memory 50 is stored following the newly stored character data representative of each character of the replacement word "orange".

It will be understood from the foregoing description that if the character data representative of the first character of the searched group of characters is accompanied by attribute data, each set of newly inserted character data representative of each replacement character will be accompanied by attribute data when the searched group of characters in the TEXT memory 52 is replaced by the replacement characters. Accordingly, the instant search-and-replace arrangement does not require subsequent insertion or addition of the attribute data for each of the newly inserted replacement characters, thereby improving the editing efficiency of the typewriter 1. Even if the number of the replacement characters exceeds that of the original characters that are to be replaced by the replacement characters, each of the added number of characters is automatically provided with the appropriate attribute data.

In the illustrated embodiment, underscoring data and boldfaced print data entered through the respective AUTO UNDERSCORE and BOLDFACE keys 11, 12 are exemplified as the attribute data. However, the principle of the present invention may be applied to other attribute data, such as overstriking data, superscript data and subscript data, which are entered through appropriate keys, if provided on the keyboard 3. The overstriking data is used to overstrike printed characters, i.e., to print a line over the printed characters so as to cross out the characters. The superscript and subscript data are used to print characters at slightly elevated or lowered positions with respect to the nominal printing level.

While the illustrated embodiment is adapted such that a single operation of the EXECUTE key 15 causes a search-and-replace operation for one occurrence of a designated group of characters in the TEXT memory 52, it is possible that the single operation of the EXECUTE key 15 will result in automatically repeating the search-and-replace cycle for all occurrences of the designated group of characters which are found in the TEXT memory 52. It is further possible that all occurrences of two or more groups of successive characters are automatically searched and replaced by respective groups of replacement characters, by a single operation of the EXECUTE key 15, if needed.

In the illustrated embodiment, the search-and-replace operation according to the principle of the invention is applied to the TEXT memory 52, such that if the first character of a searched group of successive characters in the TEXT memory 52 is accompanied with given attribute data such as the underscoring data, character data for each of the replacement characters which are substituted for the searched group of characters is automatically accompanied with the attribute data, with the character and attribute data being stored in combination as two bytes of data in the TEXT memory 52. However, the principle of the instant invention may be applied to the line buffer 71. In this case, it is possible to adapt the TEXT memory 52 such that data indicative of a range in which the attribute data is to be applied is stored at two addresses of the memory 52, one of which precedes the address corresponding to the first character of the replacement character group, and the other of which follows the address corresponding to the trailing last character of that replacement character group.

It is to be understood that various other changes, modifications and improvements may be made in the invention, without departing from the spirit and scope of the invention defined in the following claims.

What is claimed is:

1. A text processing system comprising:
    input means for entering text data representative of a text, said input means including character keys for entering character data representative of respective characters and at least one attribute-data entry key for entering attribute data which designates a manner in which the entered characters are printed, said text data including said character data and said attribute data;
    text data memory means for storing said text data;
    printing means for printing the characters entered through said character keys, in accordance with said character data and said attribute data of said text data;
    attribute-data storing control means for providing to said text data memory means attribute data entered in relation to said character data through said at least one attribute-data entry key; and
    search-and-replace control means for controlling a search-and-replace operation, said search-and-replace control means being operable to scan said text data memory means in search for a first group of character data representative of successive characters stored in said text data memory means, which first group is identical with a second group of character data representative of successive characters entered through said input means, said search-and-replace control means being operable to replace said first group of character data by a third group of character data representative of successive replacement characters,
    said search-and-replace control means including attribute data-replacing control means operable during said search-and-replace operation, if character data of said first group of character data representative of a first character of said successive characters is accompanied by specific attribute data entered through one of said at least one attribute-data entry key, to provide said specific attribute data to locations of said text data memory means corresponding to locations of said text data memory means at which said third group of character data has replaced said first group of character data, so that all of said replacement characters are printed in a manner designated by said specific attribute data.

2. A text processing system according to claim 1, wherein said input means includes as said at least one attribute data entry key at least one of an underscore key for generating as said specific attribute data underscoring data for underscoring characters and a bold face key for generating as said specific attribute data boldface print data for printing the characters in a boldfaced fashion.

3. A text processing system according to claim 1, wherein said search-and-replace control means compares said first group character data in said text data memory means with said second group of character data entered through said input means, and automatically replaces said first group of character data with said third group of character data, if said search-and-replace control means determines that said first group of character data in said memory means is identical with said second group of character data.

4. A text processing system according to claim 1, wherein said search-and-replace control means comprises:

means for automatically deleting said first group of character data from said memory means upon a determination that said first group is identical with said second group of character data;

replace-character counter means for storing data representative of the number of replacement characters represented by said third group of character data;

inserting means responsive to said means for automatically deleting said first group of character data, for inserting character data of said third group of character data sequentially in order from data corresponding to a first to a last character of said replacement characters at addresses of said memory means from which said first group of character data has been deleted, said insertion means including a memory pointer for designating said addresses of said memory means at which said data of said third group of character data are inserted, respectively;

means for incrementing said memory pointer when data representative of each of said replacement characters is inserted;

means for decrementing said replace-character counter means when said memory pointer is incremented; and means for determining whether said replace-character counter means has been zeroed or not, and activating said inserting means to insert character data for a next one of said replacement characters upon a determination that said replace-character counter has not been zeroed, and terminating an insertion of character data for said replacement characters upon a determination that said replace-character counter has been zeroed.

5. A text processing system according to claim 1, wherein said text data memory means stores said each set of character data representative of each character as one byte of data, and stores each set of said specific attribute data as another byte of data, said one byte of data and said another byte of data being stored at one address of said text data memory means.

6. A text processing system according to claim 4, wherein said attribute data-replacing control means comprises:

an attribute-data memory for storing said specific attribute data;

means for providing said specific attribute data to said attribute-data memory when said search-and-replace control means determines that said first group of character data is identical with said second group of character data; and means for providing said specific attribute data in said attribute-data memory to addresses of said text data memory means at which character data for each of said replacement characters is inserted by said inserting means.

7. A text processing system according to claim 1, wherein said attribute data-replacing control means comprises an attribute-data memory for storing said specific attribute data when said search-and-replace control means determines that said first group of character data is identical with said second group of character data, and further comprises means for providing said specific attribute data to addresses of said text data memory means at which said third group of character data has replaced said first group of character data.

8. A text processing method comprising the steps of:

entering text data representative of a text into a text data memory means through an input means, said text data comprising character data representative of characters entered through character keys of said input means, and attribute data which is entered through at least one attribute-data entry key of said input means and which designates a manner in which the entered characters are printed, said character data including a first group of character data representative of successive characters, and said attribute data being stored in relation to said first group of character data;

printing the characters entered through said character keys, according to said character data and said attribute-data;

specifying a second group of character data representative of successive characters which is identical with said first group of character data, and a third group of character data representative of replacement characters; and effecting a search-and-replace operation, by scanning said text data memory means in search for said first group of character data which is identical with said second group of character data, and by replacing said first group of character data with said third group of character data, said step of effecting a search-and-replace operation comprising determining if the character data representative of a first character of said successive characters is accompanied with specific attribute data entered through one of said at least one attribute-data entry key, and if the character data representative of said first character is accompanied with said specific attribute data, storing said specific attribute data in locations of said text data memory means corresponding to locations of said text data memory means at which said third group of character data has replaced said first group of character data, so that all of said replacement characters are printed in a manner designated by said specific attribute data.

* * * * *